US007650409B2

(12) United States Patent
Cain et al.

(10) Patent No.: US 7,650,409 B2
(45) Date of Patent: Jan. 19, 2010

(54) SYSTEM AND METHOD FOR ENABLING AUTHORIZATION OF A NETWORK DEVICE USING ATTRIBUTE CERTIFICATES

(75) Inventors: Adam Cain, Madison, WI (US); Craig R. Watkins, State College, PA (US); Jeremey Barrett, Sugar Land, TX (US)

(73) Assignee: Nokia Siemens Networks Oy, Espoo (FI)

( * ) Notice: Subject to any disclaimer, the term of this patent is extended or adjusted under 35 U.S.C. 154(b) by 509 days.

(21) Appl. No.: 10/823,378

(22) Filed: Apr. 12, 2004

(65) Prior Publication Data

US 2005/0228886 A1 Oct. 13, 2005

(51) Int. Cl.
*G06F 15/173* (2006.01)
(52) U.S. Cl. ............... 709/225; 709/229; 713/150; 713/161; 340/5.8; 340/5.85; 340/5.86
(58) Field of Classification Search ........... 709/218, 709/229, 225; 713/168, 175, 201, 150, 161; 726/2, 11, 12, 21; 340/5.8, 5.85, 5.86
See application file for complete search history.

(56) References Cited

U.S. PATENT DOCUMENTS

| 5,999,971 | A * | 12/1999 | Buckland ............... 709/218 |
| 6,199,113 | B1 * | 3/2001 | Alegre et al. .............. 709/229 |
| 6,453,353 | B1 * | 9/2002 | Win et al. ................ 709/229 |
| 6,847,995 | B1 * | 1/2005 | Hubbard et al. ............ 709/223 |
| 7,092,987 | B2 * | 8/2006 | Brittingham et al. ........ 709/203 |
| 2002/0144108 | A1 | 10/2002 | Benantar ................... 713/156 |
| 2002/0169961 | A1 * | 11/2002 | Giles et al. ................. 713/175 |
| 2003/0041240 | A1 * | 2/2003 | Roskind et al. ............. 713/168 |
| 2004/0039906 | A1 | 2/2004 | Oka et al. .................. 713/156 |
| 2004/0086126 | A1 * | 5/2004 | Lain et al. .................. 380/277 |
| 2004/0123153 | A1 * | 6/2004 | Wright et al. .............. 713/201 |

OTHER PUBLICATIONS

S. Farrell et al., "An Internet Attribute Certificate Profile for Authorization", Network Working Group, RFC 3281, Apr. 2002, pp. 1-38.
J. Kohl et al., "The Kerberos Network Authentication Service (v5)", Network Working Group, RFC1510, Sep. 1993, pp. 1-100.

(Continued)

*Primary Examiner*—Thu Ha T Nguyen
(74) *Attorney, Agent, or Firm*—Harrington & Smith, PC

(57) ABSTRACT

Methods and devices are directed to authorizing a network device to a resource over a network. An access server determines based, in part, on an attribute of the network device associated with the attribute certificate, whether the network device may be authorized access to the resource over the network. The attribute may be associated with a capability granted to the network device, a condition to be satisfied for the attribute to be valid, and the like. The attribute may belong to a group of network devices, or one or more users accessing the network through the network device. In one embodiment, the attribute certificate may be provided based on an automated security scan of the network device. In another embodiment, the access server may make the attribute available to a network resource associated with the access server.

13 Claims, 6 Drawing Sheets

OTHER PUBLICATIONS

Kim, J., et al., "Access Control Method Using Attribute Certificate in Distribution System", Mar. 2003, Korea Institute of Information, Technology & Innovation: The Journal of Information Technology, vol. 6, No. 1, pp. 107-115.

Yoon, E., et al., "Attribute Certificate Profile Research", Oct. 2001, Korea Institute of Information Security and Cryptology, vol. 11, No. 5, pp. 75-84.

* cited by examiner

SYSTEM AND METHOD FOR ENABLING AUTHORIZATION OF A NETWORK DEVICE USING ATTRIBUTE CERTIFICATES

FIELD OF THE INVENTION

The present invention relates to computer security, and in particular, to a system and method for authorizing access to a resource over a network using an attribute certificate.

BACKGROUND

Earlier attempts to associate different authorization-related attributes to clients often relied on the client IP address as a means to identify the client. However, this technique proved not to be very effective, since the IP address of a network device may easily be changed. Furthermore, proliferation of Network Address Translation (NAT) devices and Virtual Private Networks (VPNs) makes it difficult for an access server to identify a particular client solely based on the clients IP address.

Commonly used Kerberos tickets provide a means for applications to share a cryptographically authenticated credential among several applications. However, Kerberos tickets only indicate that a particular user has successfully authenticated to a central network server, thereby establishing a single user session. Kerberos tickets do not convey user capabilities and they do not span multiple user sessions.

The use of hardware tokens for authentication addresses a related need. A hardware token allows a user to prove its identity as well as its possession of a particular physical object. In return, those proven assertions may lead to an expanded access right for a network service. However, a hardware token also does not provide a general means to convey user capabilities of the client.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
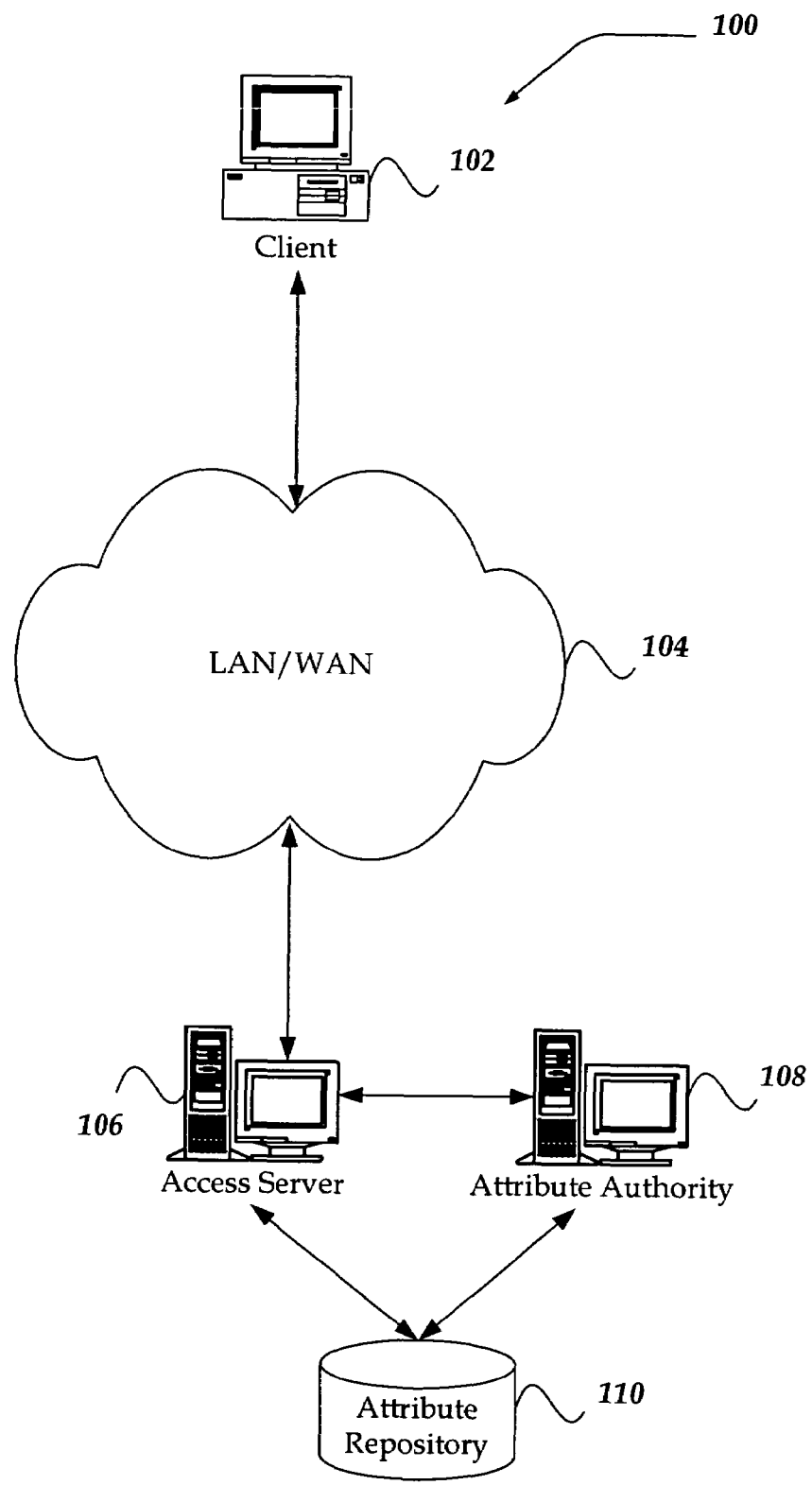
FIG. 1 illustrates one embodiment of an environment in which the invention operates.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refers to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

The term "flow" includes a flow of packets through a network. The term "connection" refers to a flow or flows of messages that typically share a common source and destination.

Briefly stated, the present invention is directed to a method and system for authorizing a network device using attribute certificates.

Different network access capabilities may be provided to a user depending on properties of the user and device used to access the network. The invention may provide a secure way for the user to demonstrate that it has been approved for access to the network. An Attribute Certificate (AC) may be a digitally signed assertion including information about capabilities, restrictions, and the like, of the user and/or the device used to access the network. If the Attribute Certificate is issued upon completion of an automated security scan of a client device, the AC may be employed to provide a secure way for the device to inform an access server of the client automated security scan results at a later time. If the AC is generated based on capabilities of the user, it provides the access server secure information needed to make network resources available to the user, based on the AC.

The AC may be issued to a user, which may present it to the access server from different client network devices. The AC may also be issued to a client network device, through which different users may access the same resource.

Illustrative Operating Environment

FIG. 1 illustrates one embodiment of an environment in which a system may operate. Not all the components may be required to practice the invention, and variations in the arrangement and type of the components may be made without departing from the spirit or scope of the invention.

As shown in the figure, system 100 includes Local Area Network/Wide Area Network (LAN/WAN) 104, client 102, access server 106, attribute authority 108, and attribute repository 110. Client 102 and access server 106 are in communication over LAN/WAN 104. Access server 106 is in further communication with attribute authority 108 and attribute repository 110. Attribute authority 108 and attribute repository 110 are also in communication with each other.

LAN/WAN 104 is enabled to employ any form of computer readable media for communicating information from one electronic device to another. In addition, LAN/WAN 104 may include the Internet in addition to local area networks, wide area networks, direct channels, such as through a universal serial bus (USB) port, other forms of computer-readable media, and any combination thereof. On an interconnected set of LANs, including those based on differing architectures and protocols, a router acts as a link between LANs, enabling messages to be sent from one to another. Also, communication links within LANs typically include twisted pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices may be remotely connected to either LANs or WANs via a modem and temporary telephone link. In essence LAN/WAN 104 may include any communication mechanism by which information may travel between network devices, such as client 102 and access server 106.

Client 102 may be any network device capable of communicating over a network, such as LAN/WAN 104, to access server 106, and the like. The set of such devices may include devices that typically connect using a wired communications medium such as personal computers, multiprocessor systems, microprocessor-based or programmable consumer electronics, network PCs, and the like, that are configured to operate as a network device. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like, that are configured as a network appliance. Alternatively, client 102 may be any device that is capable of connecting using a wired or wireless communication medium such as a PDA, POCKET PC, wearable computer, and any other device that is equipped to communicate over a wired and/or wireless communication medium, operating as a network device. As such client 102 may be configured to operate as a web server, cache server, file server, router, file storage device, gateway, switch, bridge, firewall, proxy, and the like.

Access server 106 may include any computing device or devices capable to provide authorization to a resource over LAN/WAN 104. Devices seeking access to the resource over the network, such as client 102 may be authorized by access server 106 using an attribute certificate. Devices that may operate as access server 106 include, but are not limited to, personal computers, desktop computers, multiprocessor systems, microprocessor-based or programmable consumer electronics, network PCs, web servers, cache servers, file servers, routers, gateways, switches, bridges, firewalls, proxies, and the like. The resource over the network may be any network service available to network devices connected to the network, such as client 102.

Attribute authority 108 includes any computing device or devices capable to determine an attribute of a network device seeking authorization such as client 102. Attribute authority 108 may further include network devices that verify an attribute of a network device such as client 102. Attribute authority 108 may also be configured to operate as a web server, cache server, file server, router, file storage device, gateway, switch, bridge, firewall, proxy, and the like. In one embodiment attribute authority 108 and access server 106 may reside in one computing device.

Attribute repository 110 may include any computing device or devices capable of receiving an attribute certificate from access server 106, attribute authority 108, and the like, and maintaining the attribute certificate ready for distribution. Devices that may operate as attribute repository 110 include, but are not limited to, personal computers, desktop computers, multiprocessor systems, microprocessor-based or programmable consumer electronics, network PCs, servers, and the like. Attribute repository 110 may also include a web service, an FTP service, an LDAP service, and the like, configured to manage the attribute certificate, and related information. In one embodiment, attribute repository 110 may include a storage structure for maintaining trust information, such as public keys, signatures, access control lists, revocation lists, and the like. Attribute repository 110 may include subscription information, observer mechanisms, and the like, that enable a network device, such as access server 106, and the like, to monitor an availability of the attribute certificate, and associated information.

Although not shown, attribute authority 108 and attribute repository 110 may also be in direct communication with client 102.

Figure 2:
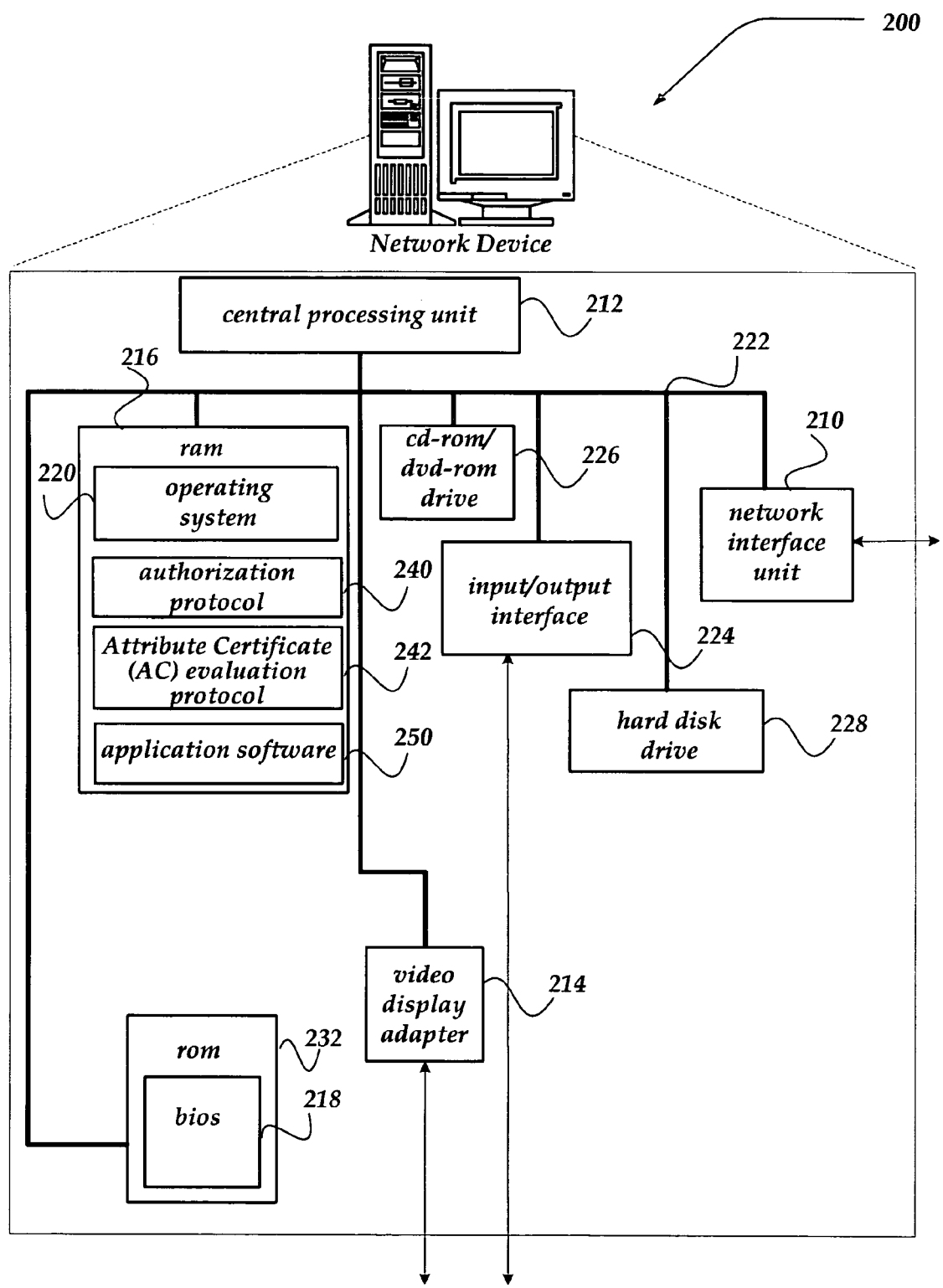
FIG. 2 illustrates a functional block diagram of one embodiment of a network device that may be configured to operate as a client.

FIG. 2 illustrates a functional block diagram of one embodiment of network device 200 in which the present invention may be practiced. Network device 200 provides one embodiment for access server 106 of FIG. 1. It will be appreciated that not all components of network device 200 are illustrated, and that network device 200 may include more or less components than those shown in the figure. Network device 200 may operate, for example, as a personal computer, a desktop computer, a multiprocessor system, a microprocessor-based or programmable consumer electronic, a network PC, a web server, a cache server, a file server, a router, a gateway, a switch, a bridge, a firewall, a proxy, and the like. The communications may take place over a network, such as LAN/WAN 104 in FIG. 1, the Internet, or some other communications network.

As illustrated in FIG. 2, network device 200 includes central processing unit (CPU) 212, video display adapter 214, read only memory (ROM) 232, random access memory (RAM) 216, hard disk drive 228, input/output interface (I/O) 224, a CDROM/DVDROM drive 226, and a network interface unit 210 interconnected via a bus 222.

RAM 216, ROM 232, CDROM/DVDROM drive 226, and hard disk drive 228 are computer storage media, which may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CDROM, digital versatile disks (DVD) or other optical storage, magnetic cassettes, magnetic tape, magnetic disk storage or other magnetic storage devices, or any other medium that can store the information and that can be accessed by a computing device.

Network interface unit 210 is constructed for use with various communication protocols including the TCP/IP and UDP/IP protocol. Network interface unit 210 may include or interface with circuitry and components for transmitting packets, and the like, over a wired and/or wireless communications medium. Network interface unit 210 is sometimes referred to as a transceiver, Network Interface Card (NIC), and the like. Network device 200 may also include an I/O interface 224 for communicating with external devices or users.

RAM 216 is generally interconnected with ROM 232 and one or more permanent mass storage devices, such as hard disk drive 228. RAM 216 stores operating system 220 for controlling the operation of network device 200. The operating system 220 may comprise an operating system such as UNIX, LINUX™, Windows™, and the like.

In one embodiment, RAM 216 stores program code for application software 250, authorization protocol 240, and Attribute Certificate (AC) evaluation protocol 242, and the like, for performing authorization functions of network device 200. Application software 250 may include any computer program. Authorization protocol 240 is directed to controlling access to a network resource as described in FIG. 3. AC evaluation protocol 242 may be a complementary protocol that enables the authorization protocol 240 to evaluate an attribute of a network device, such as client 102 of FIG. 1, desiring access to the resource over the network. The attribute may be based, in part, on a capability of client 102, a condition to be satisfied for another attribute to be valid, a result of an automated security scan, and the like.

General Operation

Figure 3:
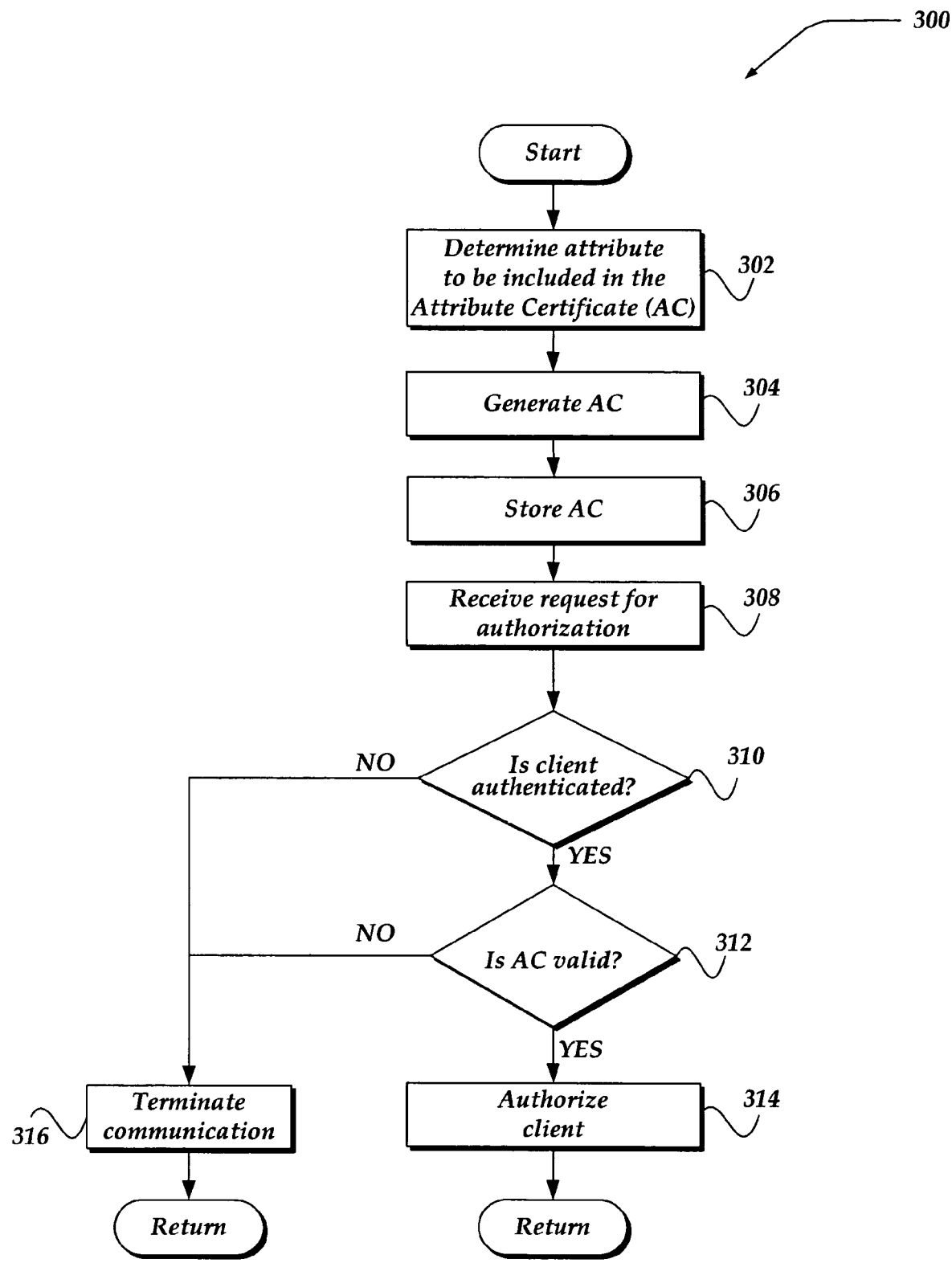
FIG. 3 illustrates a flow diagram generally showing one embodiment of a process for using an attribute certificate to authorize a client.

FIG. 3 illustrates a flow diagram generally showing process 300 for authorizing a network device using attribute certificates, according to one embodiment of the invention. Process 300 may, for example, be implemented in access server 106 of FIG. 1.

As shown in FIG. 3, process 300 begins, after a start block, at block 302, where an attribute of the network device desiring authorization, such as client 102 of FIG. 1, is determined. The attribute may be based, in part, on a capability or characteristic of the network device. For example, the network device may be a laptop issued to a particular user, and the like. In this example, the attribute may be based, in part, on the status of security software running on the network device, and the like.

The attribute, determined at block 302, may also be based, in part, on a condition to be satisfied for another attribute to be valid. In the above example, the primary attribute may be the assertion that the network device has an anti-virus software installed. The other attribute may be based, in part, on a condition that the anti-virus software is running on the network device, and the anti-virus software is configured with virus definitions that are no more than 5 days old, as a further example.

In another embodiment, the attribute, determined at block 302 may further be based, in part, on a status of the network device desiring authorization, such as a result of an automated security scan. For security reasons, an automated security scan of the network device may be performed and the result associated with the AC. Associating an automated security scan with the AC may eliminate the need to perform repeated automated security scans every time the network device requests authorization, since the AC may provide evidence of a recent automated security scan. Upon determination of the attribute to be associated with the AC, process 300 proceeds to block 304.

At block 304, the AC is generated based, in part, on the attribute determined at block 302. The AC may be generated by the device performing the authorization, such as access server 106 of FIG. 1, the network device itself, a third party network device, such as the attribute authority 108 of FIG. 1, and the like.

Processing then proceeds to block 306 of FIG. 3, where the AC is stored. The storage may also be performed by the device performing the authorization, such as access server 106 of FIG. 1, the network device itself, a third party network device, such as the attribute authority 108 of FIG. 1, and the like. Upon completion of block 306, process 300 may wait until a request for authorization is received at block 308.

At block 308, the network device presents the authorizing device with a request for authorization. Although not shown, block 308 may include actions by the authorizing device including, but not limited to, retrieving the AC from the network device, a storage device, an external storage database, and the like.

Process 300 flows to block 310, where a decision is made, to determine whether the network device is authenticated for connection to the network. If authentication is verified, processing proceeds to decision block 312. If authentication is not verified, processing proceeds to block 316, where communication is terminated. Processing may then return to a calling process to perform other actions.

At block 312, the validity of the AC is determined. In determining the validity of the AC a number of factors may be used including, but not limited to, valid date range of the AC, device identifier recorded in the AC, digital signature, and the like. If the AC is valid, process 300 proceeds to block 314, where the network device is authorized. If the AC is not valid, processing proceeds to block 316, where communication is terminated. Processing may then return to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Although the invention is described in terms of communication between a network device and an access server, the invention is not so limited. For example, the communication may be between virtually any resource, including but not limited to multiple clients, multiple servers, and any other device, without departing from the scope of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

ILLUSTRATIVE EMBODIMENTS

Figure 4:
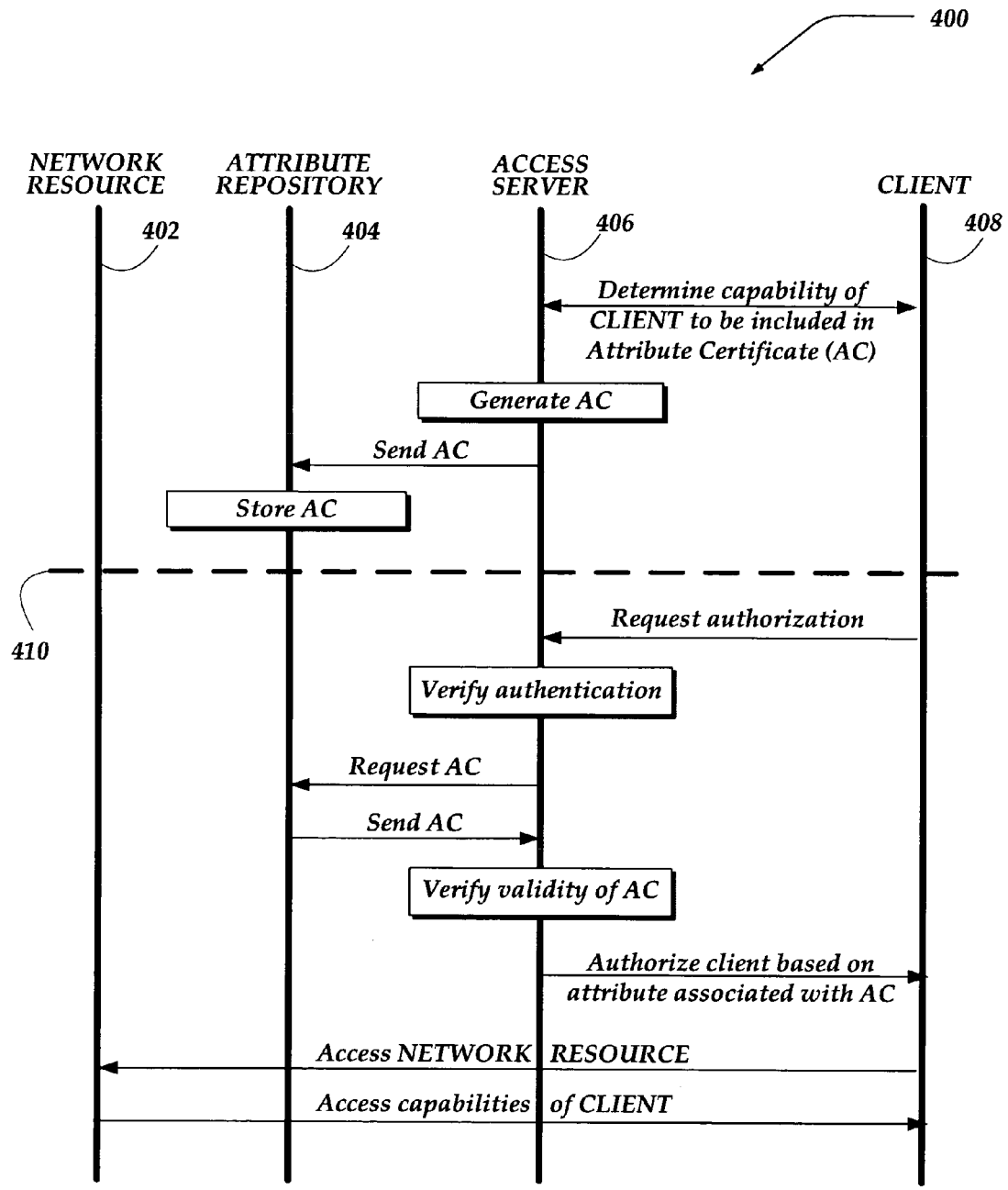
FIG. 4 illustrates message flows involved in one embodiment of the present invention.

FIG. 4 illustrates one embodiment of a message flow diagram for a system similar to the system shown in FIG. 1. As shown in the diagram, message flow 400 includes network resource 402, attribute repository 404, access server 406, and client 408 across the top. Client 408 and access server 406 may operate substantially similar to client 102 and access server 106, respectively, of FIG. 1. Time may be viewed as flowing downward in the figure.

As shown in FIG. 4, the message flows are divided into two groups separated by timeline 410. The first group comprises message flows involved in generating and storing an AC. This process may be repeated, if client 408 desires to store a certificate with a new access server, the stored AC is no longer valid for any of a variety of reasons, and the like. The process begins with access server 406 determining an attribute of client 408 to be associated with the AC. The attribute may be based, in part, on a capability of client 408. For example, client 408 may be a network device used by a user possessing temporary approval to utilize print services provided by a network resource. In this example, access server 406 may verify the printing capability approval for the network resource as the attribute to be associated with the AC.

Access server 406 may then generate the AC based, in part, on the attribute determined above. Following generation of the AC, access server 406 may send the AC to attribute repository 404, where the AC is stored.

The authorization process, as shown below timeline 410, in FIG. 4, is typically started by receiving of a request for authorization from client 408. Upon receiving the request for authorization from client 408, access server 406 authenticates client 408. Authentication may be based on a login password, a digital certificate, a biometric parameter, and the like.

Upon authentication, access server 406 requests the AC from attribute repository 404. Attribute repository 404 sends the AC to access server 406, which verifies the ACs validity. The validity of the AC may be verified based, in part, on any one of a number of factors including, but not limited to, the date range of the AC, digital signature on the AC, comparison of the identity listed in the AC with the authenticated identity of client 408, and the like.

If the AC is valid, access server 406 authorizes client 408 based, in part, on the attribute associated with the AC. Further using the example above, the authorization provides client 408 with access to printing capabilities of network resource 402 based, in part, on the attribute associated with the AC.

Figure 5:
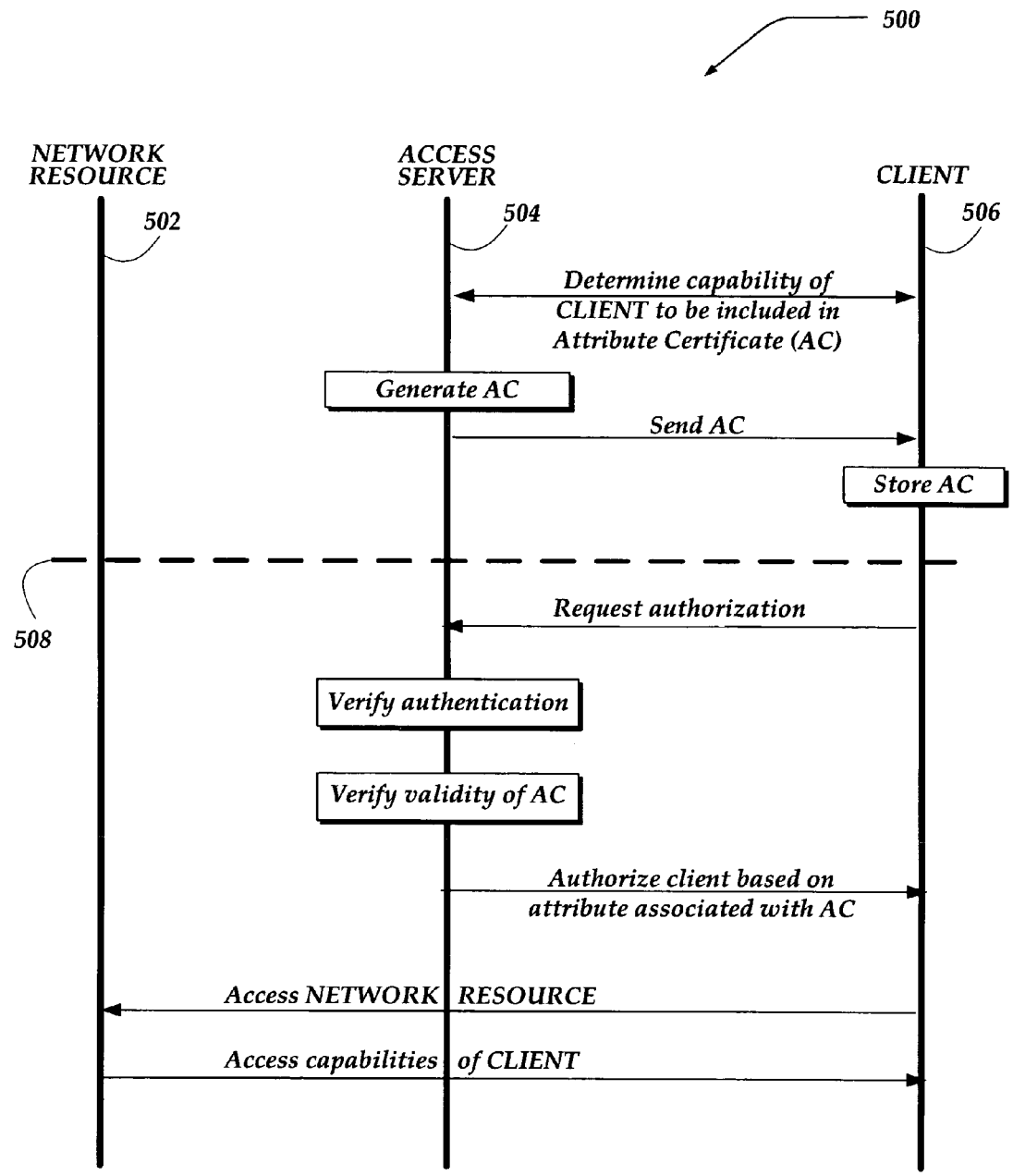
FIG. 5 illustrates message flows involved in another embodiment of the present invention.

FIG. 5 illustrates a message flow diagram for a network system in accordance with another embodiment of the present invention. As shown in the diagram, message flow 500 includes network resource 502, access server 504, and client 506 across the top. Client 506 and access server 504 may operate substantially similar to client 102 and access server 106, respectively, of FIG. 1. Time may be viewed as flowing downward in the figure.

As shown in FIG. 5, the message flows are divided into two groups separated by timeline 508. The first group comprises message flows involved in generating and storing an AC. The first part of the process is substantially similar to the first process described in FIG. 4, above timeline 410. One difference between the two processes is access server 504 sends the AC to client 506 instead of an attribute repository, and client 506 stores the AC.

The authorization process, as shown below timeline 508, in FIG. 5, is typically started by receiving of a request for authorization from client 506. Upon receiving the request for authorization from client 506, access server 504 authenticates client 506. Authentication may be based on a login password, a digital certificate, a biometric parameter, and the like.

Upon authentication, access server 504 verifies that the client is in possession of a valid AC. The validity of the AC may be verified based, in part, on any one of a number of factors including, but not limited to, the date range of the AC, digital signature on the AC, comparison of the identity listed in the AC with the authenticated identity of client 506, and the like.

If the AC is valid, access server 504 authorizes client 506 based, in part, on the attribute associated with the AC. Using the example described in FIG. 4 above, the authorization provides client 506 with access to printing capabilities of network resource 502 based, in part, on the attribute associated with the AC.

Figure 6:
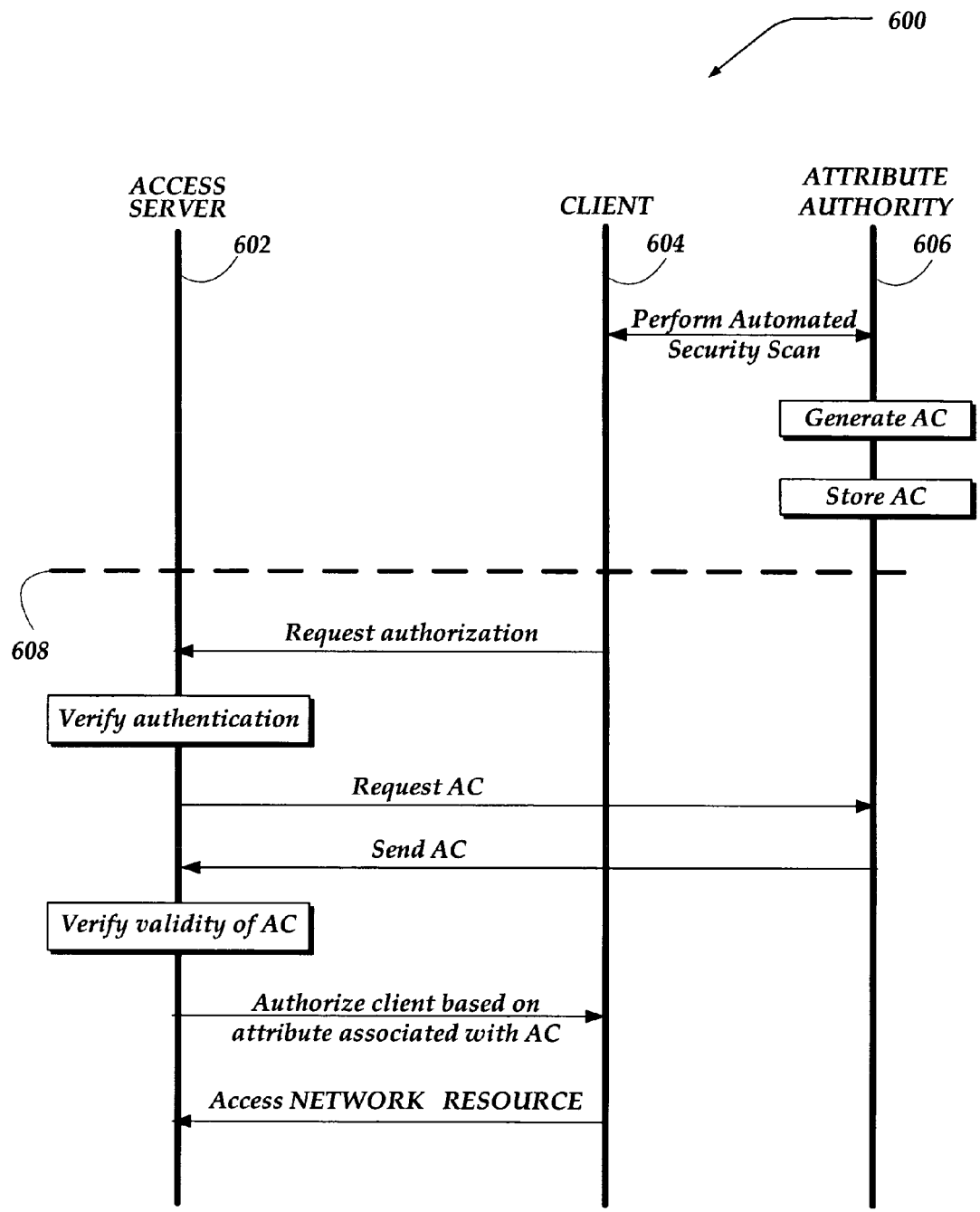
FIG. 6 illustrates message flows involved in yet another embodiment of the present invention.

FIG. 6 illustrates a message flow diagram for a network system in accordance with a further embodiment of the present invention. As shown in the diagram, message flow 600 includes access server 602, client 604, and attribute authority 606 across the top. Client 604 and access server 602 may operate substantially similar to client 102 and access server 106, respectively, of FIG. 1. Time may be viewed as flowing downward in the figure.

As shown in FIG. 6, the message flows are divided into two groups separated by timeline 608. The first group comprises message flows involved in generating and storing an AC. The process begins with an automated security scan of client 604 performed by attribute authority 606. Attribute authority 606 generates the AC based, in part, on a result of the automated security scan of client 604, and stores the AC.

The authorization process, as shown below timeline 608, in FIG. 6, is typically started by receiving of a request for authorization from client 604. Upon receiving the request for authorization from client 604, access server 602 authenticates client 604. Authentication may be based on a login password, a digital certificate, a biometric parameter, and the like.

Upon authentication, access server 602 requests the AC from attribute authority 606. Attribute authority 606 send the AC to access server 602, which verifies the validity of the AC. The validity of the AC may be verified based, in part, on any one of a number of factors including, but not limited to, the date range of the AC, digital signature on the AC, and the like.

If the AC is valid, access server 602 authorizes client 604 based, in part, on the attribute associated with the AC. In this embodiment, the authorization provides client 604 with access to network resources.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method, comprising:
   performing an automated security scan of a second network device by a first network device to determine at least one of a hardware or software capability of the second network device;
   determining an attribute for the second network device based, in part, on the determined capability;
   generating an attribute certificate for the second network device based in part on the attribute;

storing the attribute certificate including the attribute on a device other than the second network device;

receiving, at the first network device, an authentication request from the second network device for access to a resource over a network;

verifying the authentication request from the second network device, or else terminating communication with the second network device;

responsive to verifying the authentication request from the second network device, the first network device requesting and receiving from the other device the stored attribute certificate for the second network device; and the first network device determining whether the received attribute certificate for the second network device is valid, where if the attribute certificate is determined valid, authorizing access to the resource over the network based, in part, on the attribute associated with the attribute certificate, or else terminating communication with the second network device, wherein the validity of the received attribute certificate is based on factors comprising: a date range of the attribute certificate, a digital signature on the attribute certificate, and a comparison of an identity listed in the attribute certificate with the verified authentication request.

2. The method of claim 1, wherein the attribute is further determined based, in part, on a condition to be satisfied.

3. The method of claim 1, where the validity of the received attribute certificate is based on factors comprising at least one of a date range of the attribute certificate, a digital signature on the attribute certificate, and a comparison of an identity listed in the attribute certificate with the verified authentication request.

4. The method of claim 1, wherein the attribute is further associated with at least one of a group of users and a group of network devices.

5. The method of claim 1, wherein the attribute certificate is generated by at least one of the first network device, an access server, and an attribute authority.

6. The method of claim 1, wherein the attribute certificate is stored in at least one of the first network device, and an attribute repository.

7. The method of claim 6, wherein the attribute certificate is provided to an access server through the use of at least one of a cookie, a program, and a manual upload.

8. An apparatus, comprising:

an interface configured to perform an automated security scan of a network device to determine at least one of a hardware or software capability of the network device;

a processor configured to determine an attribute for the network device based, in part on the determined capability;

the processor further configured to generate an attribute certificate for the network device based, in part, on the attribute;

the interface configured to store the attribute certificate including the attribute on a device other than the network device;

the processor configured to receive an authentication request from the network device for access to a resource over a network;

the processor configured to verify the authentication request from the network device, or else to terminate communication with the network device;

responsive to verifying the authentication request from the network device, the processor and the interface are configured to request and receive from the other device the stored attribute certificate for the network device; and the processor is configured to determine whether the received attribute certificate for the network device is valid, where if the attribute certificate is determined valid, the processor is configured to authorize access to the resource over the network based, in part, on the attribute associated with the attribute certificate, or else terminate communication with the network device, wherein the validity of the received attribute certificate is based on factors comprising: a date range of the attribute certificate, a digital signature on the attribute certificate, and a comparison of an identity listed in the attribute certificate with the verified authentication request.

9. The apparatus of claim 8, wherein the processor is further configured to generate the attribute certificate based on a condition to be satisfied.

10. The apparatus of claim 8, wherein the interface is further configured to send the attribute certificate to an attribute repository to be stored.

11. A device for managing authorization to a resource over a network, comprising:

means for performing an automated security scan of a network device to determine at least one of a hardware or software capability of the network device;

means for determining an attribute for the network device based, in part, on the determined capability of the network device;

means for generating an attribute certificate for the network device, wherein the attribute certificate is based in part on the attribute;

means for storing the attribute certificate on a device other than the network device;

means for receiving an authentication request from the network device for access to a resource over the network;

means for verifying the authentication request from the network device, or else terminating communication with the network device;

means, responsive to verifying the authentication request from the network for requesting and receiving from the other device the stored attribute certificate for the network device;

means for determining whether the received attribute certificate for the network device is valid, where if the attribute certificate is determined valid, and means for authorizing access to the resource over the network based, in part, on the attribute associated with the attribute certificate, or else for terminating communication with the network device, wherein the validity of the received attribute certificate is based on factors comprising: a date range of the attribute certificate, a digital signature on the attribute certificate, and a comparison of an identity listed in the attribute certificate with the verified authentication request.

12. The device of claim 11, where the means to perform an automated scan comprises an interface; and the means for determining, generating, storing, and means responsive comprises a central processing unit coupled to the interface and further coupled to a memory.

13. A computer readable medium encoded with a computer program executable by a processor to perform actions comprising:

performing an automated security scan of a network device to determine at least one of a hardware or software capability of the network device;

determining an attribute for the network device based, in part, on the determined capability;

generating an attribute certificate for the network device based in part on the attribute;
storing the attribute certificate including the attribute on a device other than the network device;
receiving an authentication request from the network device for access to a resource over a network;
verifying the authentication request from the network device, or else terminating communication with the network device;
responsive to a verified authentication request from the network device, requesting and receiving from the other device the stored attribute certificate for the network device; and
determining whether the received attribute certificate for the network device is valid, where if the attribute certificate is determined valid, authorizing access to a resource over a network based, in part, on the attribute associated with the attribute certificate, or else terminating communication with the network device, wherein the validity of the received attribute certificate is based on factors comprising: a date range of the attribute certificate, a digital signature on the attribute certificate, and a comparison of an identity listed in the attribute certificate with the verified authentication request.

* * * * *